US010843305B2

(12) United States Patent
Koon et al.

(10) Patent No.: US 10,843,305 B2
(45) Date of Patent: Nov. 24, 2020

(54) LAPPING DEVICE OR CARRIER WITH ADAPTIVE BENDING CONTROL

(71) Applicant: Seagate Technology LLC, Cupertino, CA (US)

(72) Inventors: Hew Peng Koon, Penang (MY); Ooi Ee Lee, Penang (MY); Yuhong Xiong, Maple Grove, MN (US); Loh Soo Chun, Penang (MY)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 639 days.

(21) Appl. No.: 14/215,921

(22) Filed: Mar. 17, 2014

(65) Prior Publication Data
US 2015/0258655 A1 Sep. 17, 2015

(51) Int. Cl.
*B24B 37/04* (2012.01)
*B24B 37/30* (2012.01)
*G11B 5/31* (2006.01)

(52) U.S. Cl.
CPC ............ *B24B 37/048* (2013.01); *B24B 37/30* (2013.01); *G11B 5/3169* (2013.01)

(58) Field of Classification Search
CPC ....... B24B 37/048; B24B 37/27; B24B 37/30; B24B 49/10; B24B 37/04; G11B 5/3169
USPC ...... 451/5, 10, 41, 54, 55; 29/603.1, 603.16, 29/603.17
See application file for complete search history.

(56) References Cited

U.S. PATENT DOCUMENTS 5,998,906 A * 12/1999 Jerman .................. G02B 6/357
310/309
6,045,431 A * 4/2000 Cheprasov ............... B23Q 1/34
451/5
(Continued)

FOREIGN PATENT DOCUMENTS

CN 1312147 A 9/2001
CN 1436112 A 8/2003
(Continued)

OTHER PUBLICATIONS

First Office Action, including Search Report, for Chinese Patent Application No. 201510319203.1, dated Oct. 21, 2016, 13 pages.
(Continued)

*Primary Examiner* — Monica S Carter
*Assistant Examiner* — Marcel T Dion
(74) *Attorney, Agent, or Firm* — Westman, Champlin & Koehler, P.A.

(57) ABSTRACT

An adaptive bending structure or insert for a lapping device is disclosed. In illustrated embodiments the bending structure provides a wider control width between bending nodes for imparting bending to a workpiece for lapping or longer beam length to increase stroke input at outer ends of the bending structure. In illustrated embodiments, outer bending fingers of the bending structure have a wider width than inner bending fingers to provide the wider control width of the adaptive bending structure. The wider bending fingers of the bending structure connect to actuator fingers of an actuator module to adapt the actuator module to provide an increased control width for controlling bow and curvature of the workpiece during the lapping process.

18 Claims, 13 Drawing Sheets

(56) References Cited

U.S. PATENT DOCUMENTS

| | | | |
|---|---|---|---|
| 6,217,425 B1* | 4/2001 | Shindou | B24B 37/00 29/603.16 |
| 6,261,165 B1 | 7/2001 | Lackey et al. | |
| 6,375,539 B1* | 4/2002 | Sudo | B24B 37/042 451/232 |
| 6,428,385 B1* | 8/2002 | Watanuki | B24B 7/228 451/11 |
| 6,447,367 B1* | 9/2002 | Kozu | B23Q 1/34 29/603.16 |
| 6,558,721 B1 | 5/2003 | Parsons et al. | |
| 6,599,170 B2* | 7/2003 | Sone | B24B 37/048 29/603.16 |
| 6,623,336 B2 | 9/2003 | Shindou et al. | |
| 6,758,721 B2 | 7/2004 | Shindo et al. | |
| 6,939,204 B2 | 9/2005 | Moriya | |
| 6,991,513 B2 | 1/2006 | Tohta et al. | |
| 7,153,198 B2 | 12/2006 | Fujii et al. | |
| 8,066,547 B1* | 11/2011 | Schuh | B24B 37/048 451/1 |
| 8,241,092 B1 | 8/2012 | Lytle | |
| 9,427,842 B1* | 8/2016 | Moravec | B24B 37/27 |
| 10,183,376 B1* | 1/2019 | Xiong | B24B 37/048 |
| 2002/0016130 A1* | 2/2002 | Nomura | B24B 37/048 451/5 |
| 2003/0199228 A1* | 10/2003 | Kennedy | B24B 37/048 451/11 |
| 2004/0209546 A1* | 10/2004 | Nishioka | B24B 37/005 451/5 |
| 2006/0160473 A1* | 7/2006 | Fujii | B24B 37/048 451/41 |
| 2008/0242203 A1* | 10/2008 | Abe | B24B 37/048 451/314 |
| 2017/0372729 A1* | 12/2017 | Davis | G11B 5/1278 |

FOREIGN PATENT DOCUMENTS

| | | |
|---|---|---|
| CN | 1762658 A | 4/2006 |
| JP | 2004-58211 A | 2/2004 |
| JP | 2004-142040 A | 5/2004 |
| JP | 2005-219189 A | 8/2005 |
| JP | 2008-310927 A | 12/2008 |

OTHER PUBLICATIONS

Fourth Office Action, including Search Report, for Chinese Patent Application No. 201510319203.1, dated Aug. 1, 2018, 23 pages.
Third Office Action for Chinese Patent Application No. 201510319203.1, dated Feb. 27, 2018, 12 pages.
Second Office Action, including Search Report, for Chinese Patent Application No. 201510319203.1, dated Sep. 5, 2017, 22 pages.
Search Report for Singaporean Application No. 10201501724W, dated Oct. 5, 2017, 3 pages.
First Written Opinion for Singaporean Application No. 10201501724W, dated Oct. 30, 2017, 7 pages.
Second Written Opinion for Singaporean Application No. 10201501724W, dated Nov. 29, 2018, 8 pages.
Decision on Rejection for Chinese Patent Application No. 201510319203.1, dated Feb. 2, 2019, 17 pages.
Written Opinion for Singaporean Application No. 10201501724W, dated Feb. 27, 2020, 5 pages.
Notice of Reexamination for Chinese Patent Application No. 201510319203.1, dated Apr. 10, 2020, 11 pages.

* cited by examiner

LAPPING DEVICE OR CARRIER WITH ADAPTIVE BENDING CONTROL

SUMMARY

The present application discloses a lapping device or carrier with adaptive bending control for lapping a workpiece. In illustrated embodiments, the lapping device utilizes an adaptive bending structure that provides a wider control width or increased stroke at end bending nodes of the bending structure. Input bending is applied to bending nodes of the bending structure through bending fingers extending along the width of the bending structure. The bending fingers align with actuator fingers of an actuator module which impart bi-directional force to the bending fingers. Bending is transmitted from the bending fingers to a workpiece platform supporting a workpiece for lapping.

In illustrated embodiments, the outer bending fingers at the ends of the bending structure have an extended width compared to one or more inner bending fingers to adapt the actuator module to provide an increased control width for controlling bow and curvature of the workpiece during the lapping process. Input to the bending fingers is transferred to the workpiece platform through one or more bending beams connecting the bending fingers to a support structure of the workpiece platform. The bending beams connected to the outer bending fingers have a longer beam length than the bending beams connected to the one or more inner bending fingers to provide an adaptive bending structure with increased stroke at the end bending nodes. Other features and benefits that characterize embodiments of the present invention will be apparent upon reading the following detailed description and review of the associated drawings.

DETAILED DESCRIPTION OF ILLUSTRATIVE EMBODIMENTS

Figure 1:
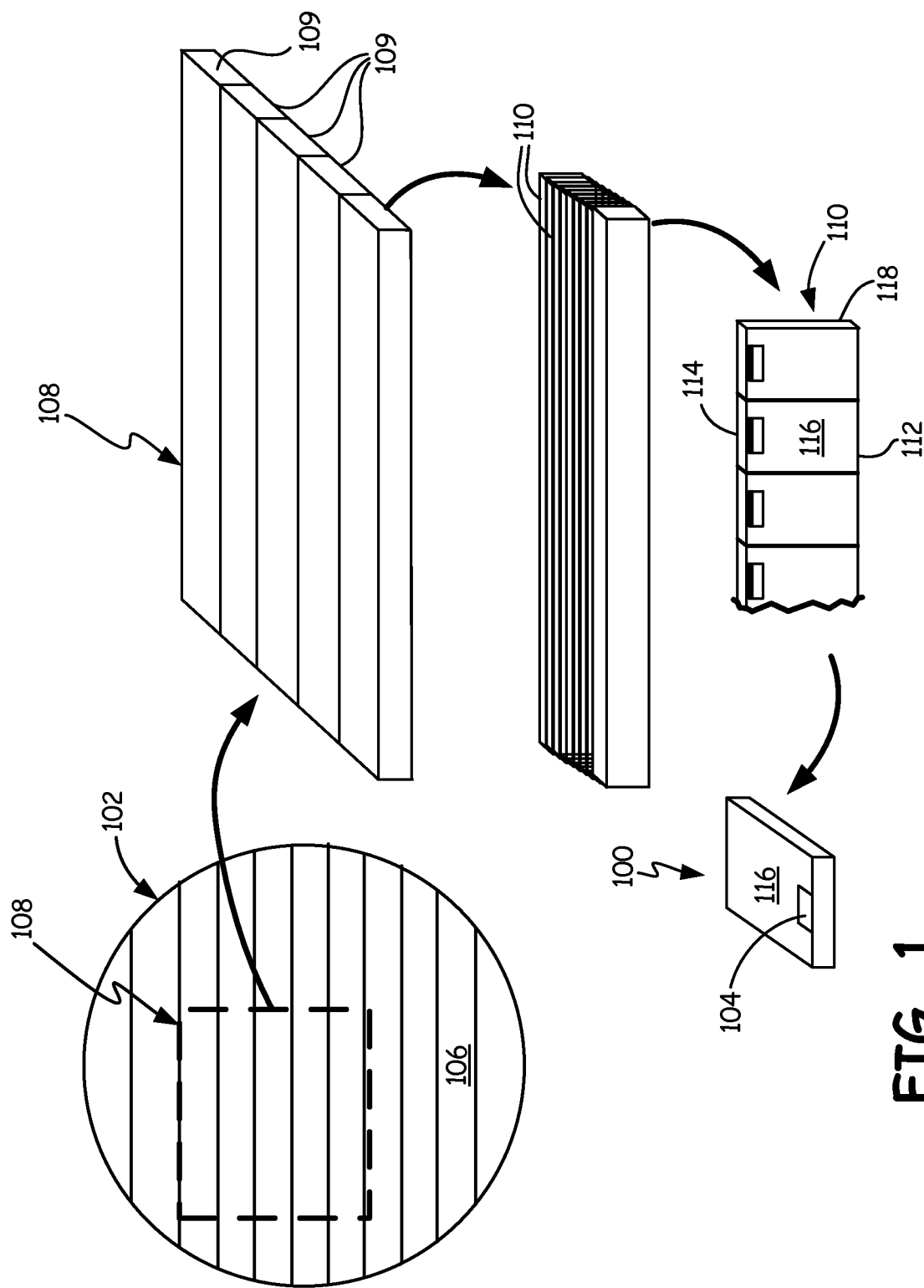
FIG. 1 is a schematic illustration of a workpiece for embodiments of a lapping assembly described in the application.

The present application relates to a carrier or bending structure for imparting bending to a workpiece during a lapping process to control a lapped profile of the workpiece. Lapping processes are used to remove material from a workpiece to control various dimensions and parameters of the workpiece. Embodiments of the carrier or bending structure described in the application are used to lap slider bars as shown in FIG. 1 to fabricate heads 100 of a data storage device to read and write data on a magnetic storage media. As shown in FIG. 1, transducer heads 100 are typically fabricated on a wafer substrate 102. Transducer elements 104 of the heads 100 are deposited or formed on a surface 106 of the wafer substrate 102 using thin film deposition techniques. Following deposition of the transducer elements 104, the wafer 102 is sliced into a bar chunk 108. The bar chunk 108 is sliced into bar stacks 109 which are sliced into slider bars 110. The sliced bars 110 have a leading edge 112, a trailing edge 114, air bearing surface 116 and a back surface 118. The transducer elements 104 are formed along the air bearing surface 116 at the trailing edge 114 of the slider bars 110. Slider bars 110 are lapped to control the thickness of the bar 110 and stripe height of the transducer elements as well as to enhance flatness, bow and perpendicularity of the air bearing surface 116 and back surface 118 of the slider bar 110. The lapped bar 110 is then sliced to form the individual transducer heads 100 of the data storage device. Typically, the bars 110 are formed of a ceramic material such as Alumina ($Al_2O_3$)-Titanium Carbide (Ti—C) and the transducer elements 104 include read and write elements fabricated via the thin film deposition layers.

Figure 2A:
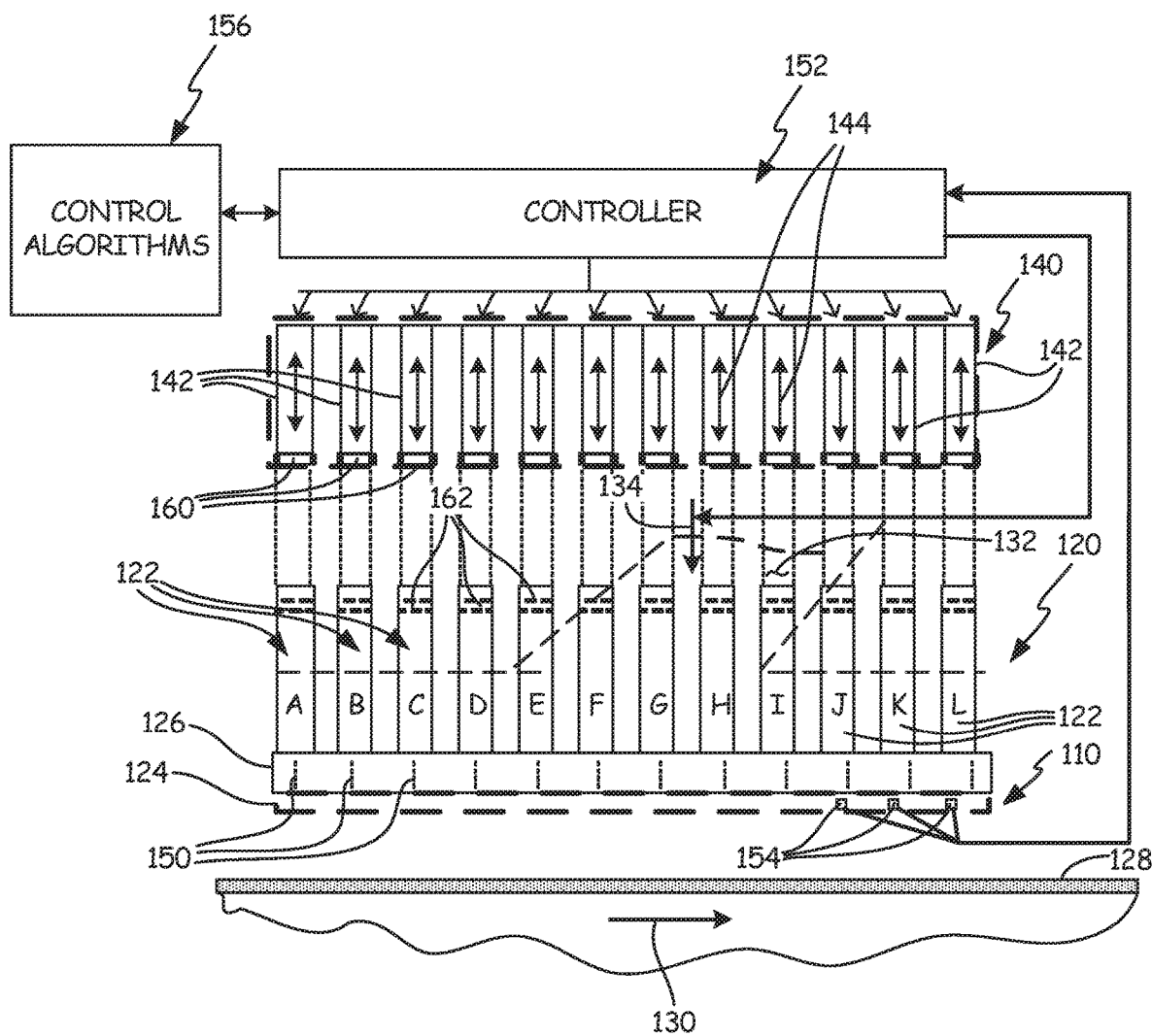
FIG. 2A is a schematic illustration of a lapping assembly utilizing a plurality of bending fingers connectable to actuator elements of an actuator module to control bending of a workpiece, such as a slider bar shown in FIG. 1

FIG. 2A schematically illustrate an embodiment of a lapping device or assembly including a carrier or bending structure 120 having a plurality of bending fingers 122A-L to adjust a profile of a workpiece 124 supported by the carrier or bending structure for lapping. In the embodiment shown in FIG. 2A, the workpiece 124 is a slider bar 110. The workpiece 124 or slider bar 110 is supported on a workpiece platform 126 and is biased against an abrasive lapping surface 128 for lapping. In the embodiment shown, the abrasive lapping surface 128 is on a rotating platen that moves relative to the workpiece 124 as illustrated by arrow 130 to abrade material from the workpiece 124. The carrier or bending structure 120 is coupled to an arm 132 (shown in phantom) to support the workpiece 124 or slider bar against the lapping surface 128. As illustrated by arrow 134, force is applied through arm 132 to bias the workpiece 124 against the abrasive lapping surface 128.

During the lapping process, bending is applied to the workpiece 124 to control the profile of the workpiece. Bending is applied through an actuator module 140 including a plurality of actuator elements or actuator fingers 142 to impart bending to the workpiece 124 through the plurality of bending fingers 122 on the carrier or bending structure 120. The actuator elements or fingers 142 provide bi-directional input force as illustrated by arrows 144 to impart bi-direction input to the bending fingers 122 A-L. Illustrative actuator elements 142 include voice coil actuator elements 142 but application is not limited to a particular actuator structure. Current is supplied to the voice coil actuator elements to apply a force proportional to the supplied current. As shown in FIG. 2A, the input force is supplied to multiple bending fingers 122A-L to impart bending to the workpiece 124 through multiple bending nodes 150 aligned with the bending fingers 122A-L. A width dimension between end nodes 150A-150L provides a control width for adjusting the bow and profile of the workpiece 124 for lapping.

Figure 2B:
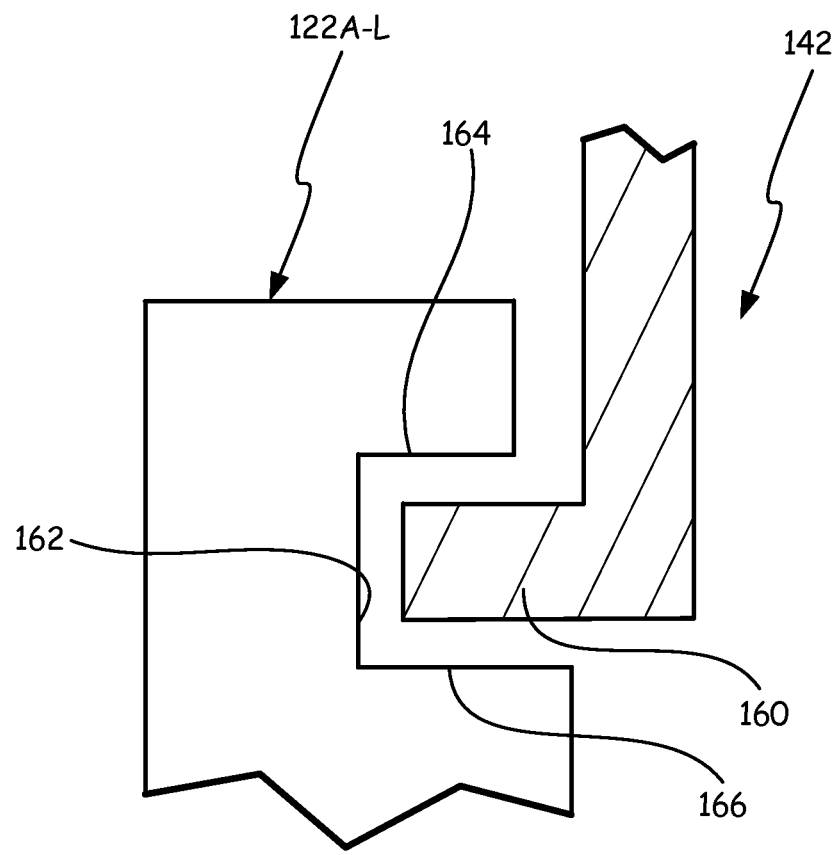
FIG. 2B is a detailed illustration of connective elements for connecting the actuator elements to the bending fingers of a carrier or bending structure.

As illustrated, input to the actuator elements or fingers 142 is controlled via hardware and software components of a controller 152 based upon feedback from electronic lapping guides 154 spaced along the workpiece 124 or slider bar 110 utilizing control algorithms 156. Thus, as shown, the controller 152 utilizes feedback from the lapping guides 154 to apply the input force to adjust bow or curvature of the workpiece 124. The input force or bending is also used to reduce residual stress in the workpiece 124. The actuator elements or fingers 142 are connected to the bending fingers 122 to impart bending through connective elements. As shown in FIG. 2B, the connective elements include a finger projection 160 on the actuator finger 142 which inserts into a slot 162 on the bending fingers 122A-L. The slots 162 include upper and lower surfaces 164, 166 to facilitate bi-directional bending input through the bending fingers 122A-L. Upper and lower refers to an orientation during the lapping process where lower refers to a position proximate to the abrasive lapping surface 128 and upper refers to a position spaced from the abrasive lapping surface 128. Thus, finger projections 160 contact the upper surface 164 to impart a bending input to the workpiece 124 in a first direction and contact the lower surface 166 to impart bending input in a second opposite direction to provide an input bending profile to compensate for curvature or bow of the workpiece or control stripe height of the transducer elements of the slider bar 110. Although the illustrative connective elements disclosed include finger projections insertable into slots 162, application is not limited to particular connective elements to connect the bending fingers 122 to the actuator elements 142 described.

As shown in FIG. 2A, the bending nodes 150 of the bending fingers 122A-L correspond to alignment and spacing of the actuator fingers 142 so that the control width corresponds to the width between actuator elements or fingers 142 at the ends of the actuator module 140. In FIG. 2A, the control width or span of the bending nodes 150 provide sufficient bending control along the length of the workpiece 124 to compensate for stress and bow in the workpiece 124 between end nodes 150A and 150L. In contrast as shown in FIG. 2C, the control width between end nodes 150A and 150L of the bending fingers 122A-L is smaller than the length of the workpiece 124-1 which limits or reduces effective control at opposed ends of the workpiece 124-1 which can reduce tolerance control for the lapped workpiece 124.

Figure 2C:
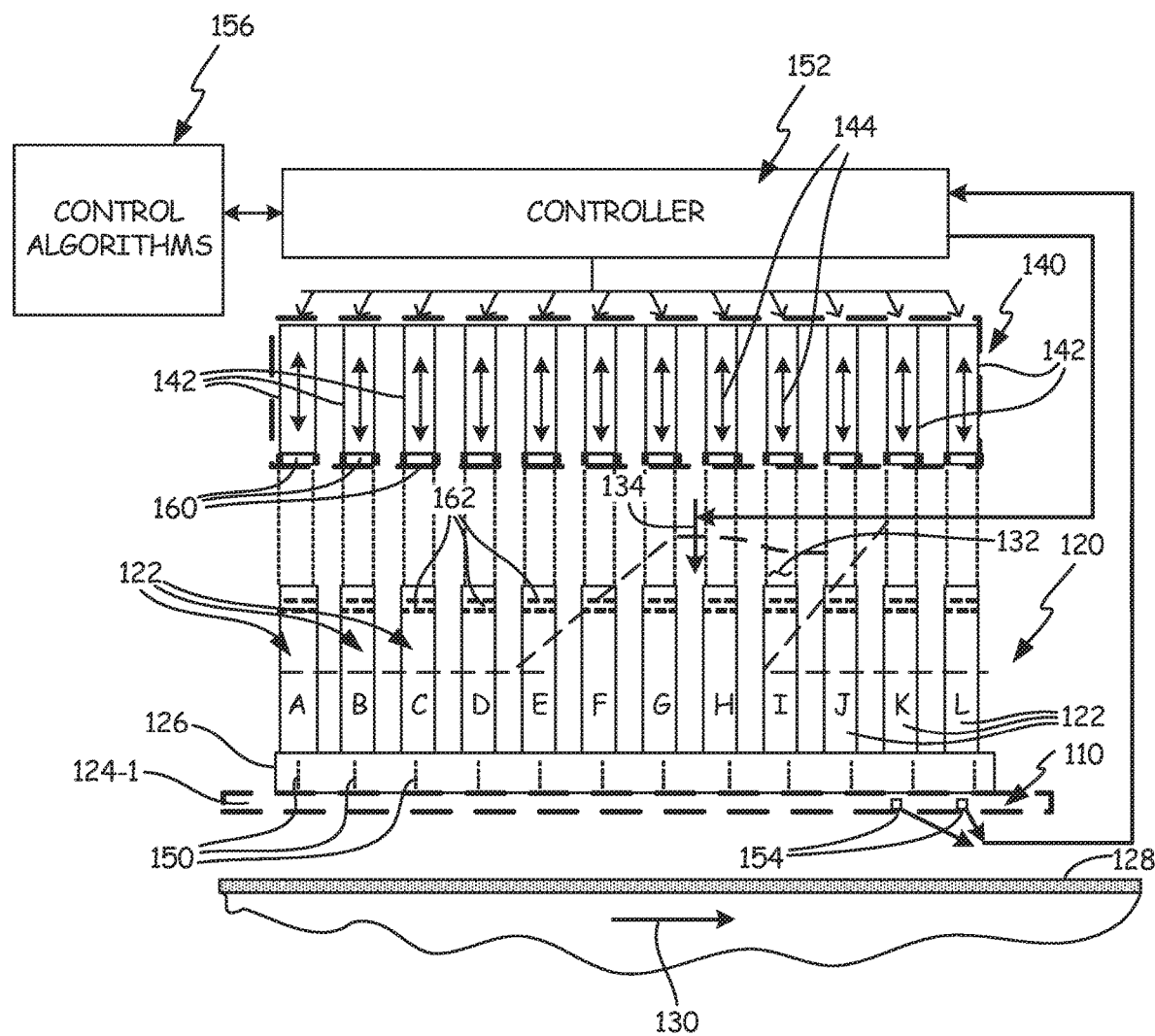
FIG. 2C is a schematic illustration of a lapping arrangement similar to FIG. 2A to lap a workpiece having a wider cross width.
Figure 2D:
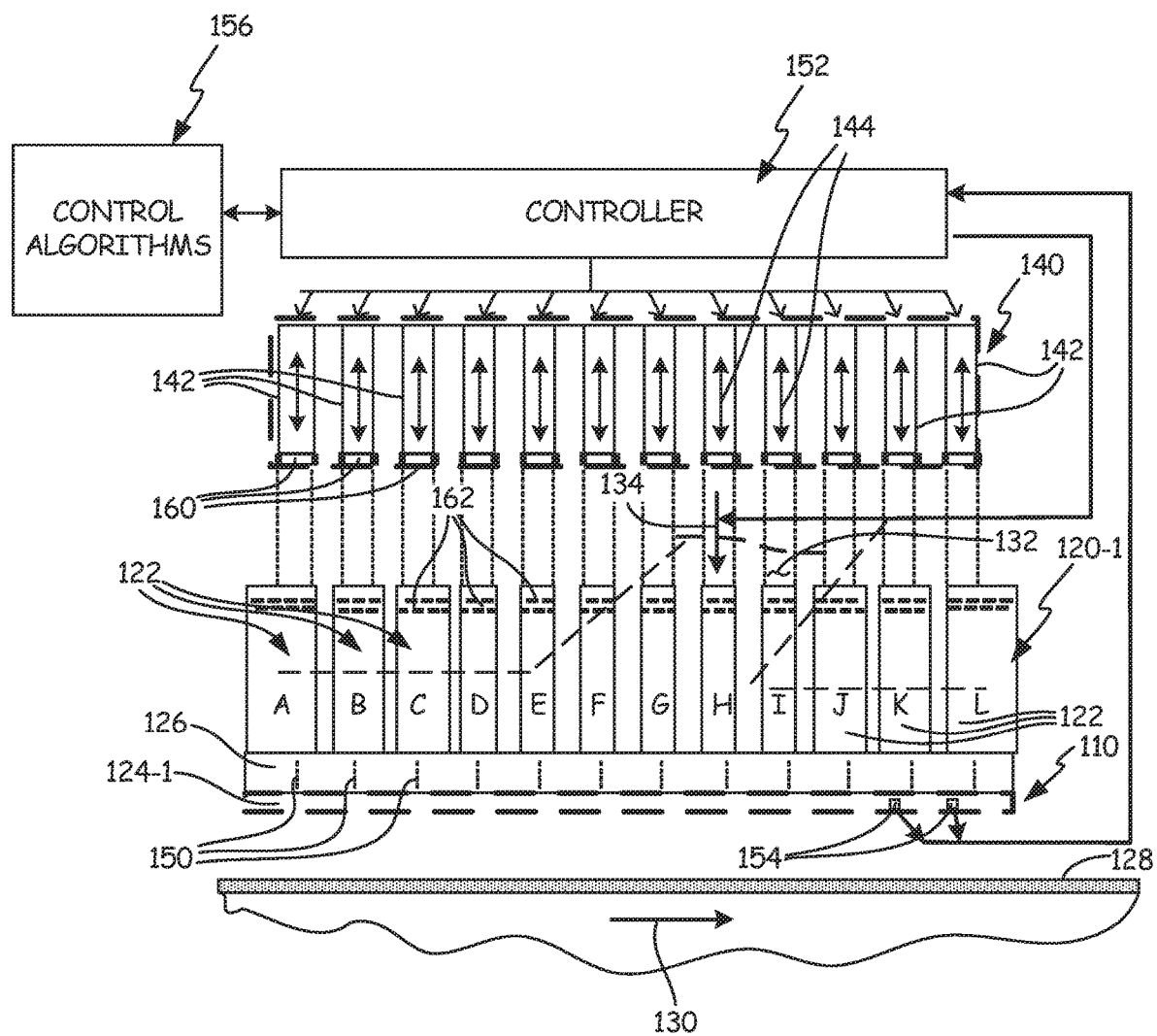
FIG. 2D is a schematic illustration of an adaptive carrier or bending structure to control bending of a workpiece having a wider cross width similar to FIG. 2C.

FIG. 2D illustrates an embodiment of an adaptive carrier structure 120-1 for the actuator module 140 illustrated in FIGS. 2A and 2C. The adaptive carrier structure 120-1 includes bending fingers 122 having different widths to increase the control width corresponding to the input bending nodes 150. In the illustrated embodiment the adaptive carrier structure 120-1 includes bending fingers 122 A-L similar to FIGS. 2A and 2C. Bending fingers 122 A-C and 122J-L on opposed ends of the carrier or bending structure 120-1 have a wider width dimension than inner bending fingers 122 D-I. The increased width of bending fingers 122A-C and 122J-L increases the control width of the bending fingers 122A-L to provide sufficient bending control along the entire cross width of workpiece 124-1 or slider bar 110.

Figure 2E:
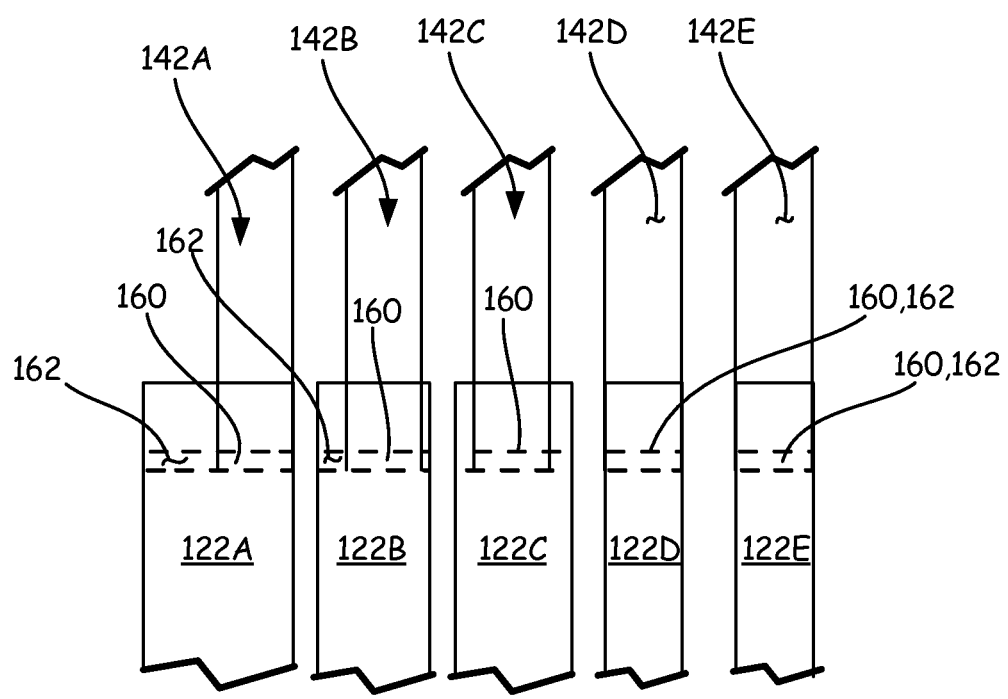
FIG. 2E illustrates connection of actuator fingers of the actuator module to bending fingers where outer bending fingers of the structure have an adaptive or wider cross width.

As schematically shown in FIG. 2E, the width of bending fingers 122A-C and 122J-L (not shown) is designed to align with and connect to actuator fingers 142A-C and 142J-L (not shown) of the actuator module 140 while providing the increased control width for the input bending nodes 150. The extended width of bending fingers 122A-C and 122J-L extends beyond outer edges of the corresponding actuator fingers 142 to progressively increase the control width of the input bending fingers 122 while allowing insertion of the finger projections 160 of the actuator fingers 142A-C and 142J-L (not shown) into bending finger slots 162A-C and 162J-L (not shown) of bending fingers 142A-C and 142J-L (not shown). As shown in FIG. 2E, the bending fingers 142A-C are aligned off-axis from a center line axis of the projections 160 of the outer actuator fingers 142A-C.

Figure 3A:
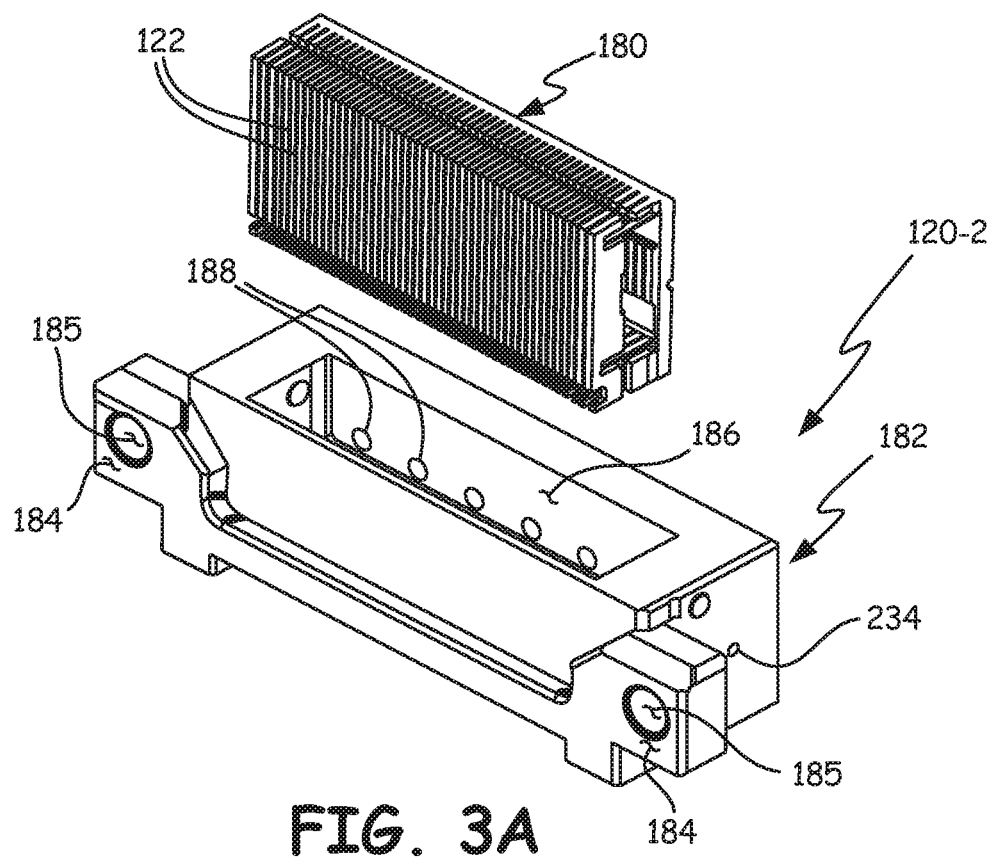
FIGS. 3A-3B illustrate an embodiment of a modular carrier assembly including a carrier base and bending insert including the plurality of bending fingers to impart bending to the workpiece for lapping.
Figure 3B:
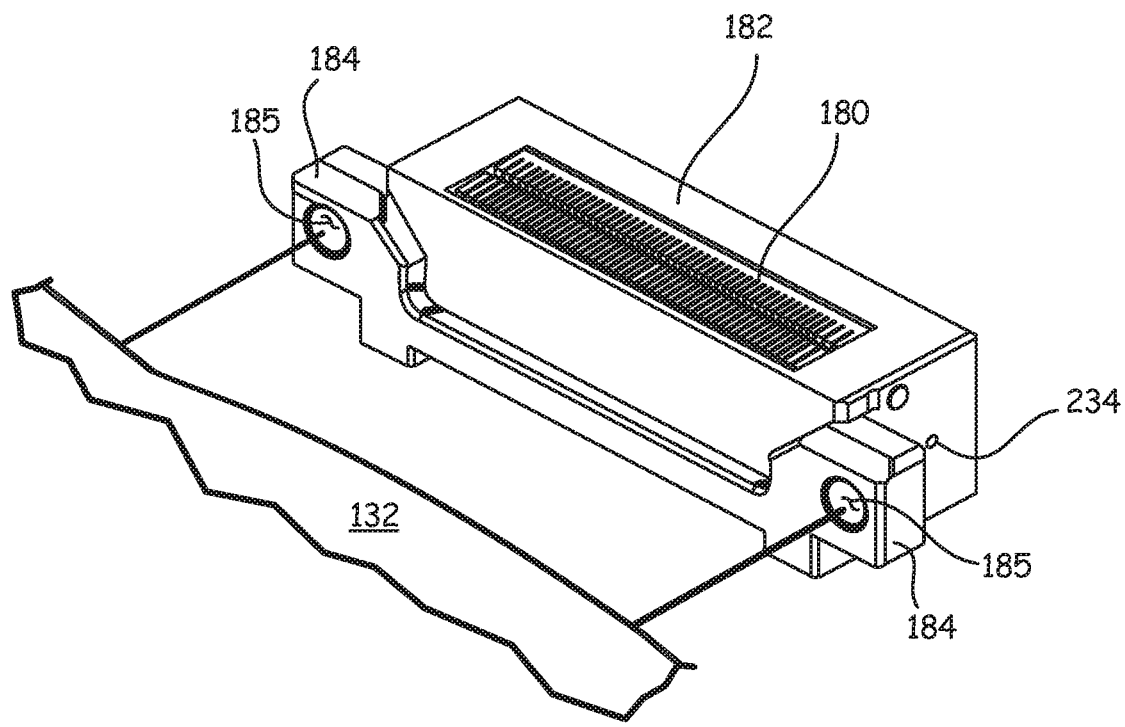

FIGS. 3A-3B illustrate an embodiment of a modular carrier-bending structure 120-2 including the plurality of bending fingers 122 to impart bending to a workpiece 124. The modular carrier-bending structure 120-2 includes a bending insert 180 and a carrier base 182. As shown, the bending fingers 122 are formed along the bending insert 180. The carrier base 182 includes flange portions 184 extending from opposed sides of a front end of the base 182 to attach the carrier-bending structure to the arm 132 (schematically shown) of the lapping device through openings 185. The bending insert 180 is insertable into an insert cavity 186 of the carrier base 182. Fastener openings 188 on a back side of the base 182 are used to secure the bending insert 180 to the carrier base 182.

FIGS. 4A-4F illustrate an embodiment of a bending insert 180 for the carrier-bending structure 120-2 illustrated in FIGS. 3A-3B. As shown, the insert 180 includes a front bending part 190 and a back workpiece part 192 connected through upper and lower bending beams 200, 202. As shown, the bending part 190 includes the plurality of bending fingers 122 spaced along the width of the front bending part 190. As shown, each of the bending fingers 122 includes the slot 162 configured to receive the finger projection 160 of each of the actuator elements 142 (not shown in FIGS. 4A-4F) to connect the actuator fingers 142 to the bending fingers 122 to impart input force to each of the bending fingers 123. As shown, the slots 162 include the upper and lower input surfaces 164, 166 to impart bidirectional force to each of the bending fingers 122 through bi-directional actuation of the actuator elements 142.

The workpiece platform 126 (not labeled/shown in FIGS. 4A-4F) may be included on the front bending part 190 along bending fingers 122A-C, 12D and 122A-C to support the workpiece against the lapping surface 128 (not labeled/shown in FIGS. 4A-4F) for lapping. Bending is imparted to the workpiece 124 (not shown in FIGS. 4A-4F), through the plurality of bending fingers 122 and the bending beams 200, 202 connecting the bending fingers 122 to the workpiece platform 126 (not labeled/shown in FIGS. 4A-4F) on the front workpiece part 190. As shown, finger-like segments 210 extend from the upper and lower rails 206, 208 of the workpiece part 192 to allow flexure of the workpiece part 192 to impart bending to the workpiece 124 (not shown in FIGS. 4A-4F) supported on the workpiece platform 126 (not labeled/shown in FIGS. 4A-4F). As shown, the upright structure 204 also includes a plurality of finger-like segments 212 spaced along a width of the upright structure 204 to provide reduced thickness portions. The finger-like segments 210, 212 are spaced similar to the spacing between the bending fingers 122 and beams 200, 202.

Figure 4A:
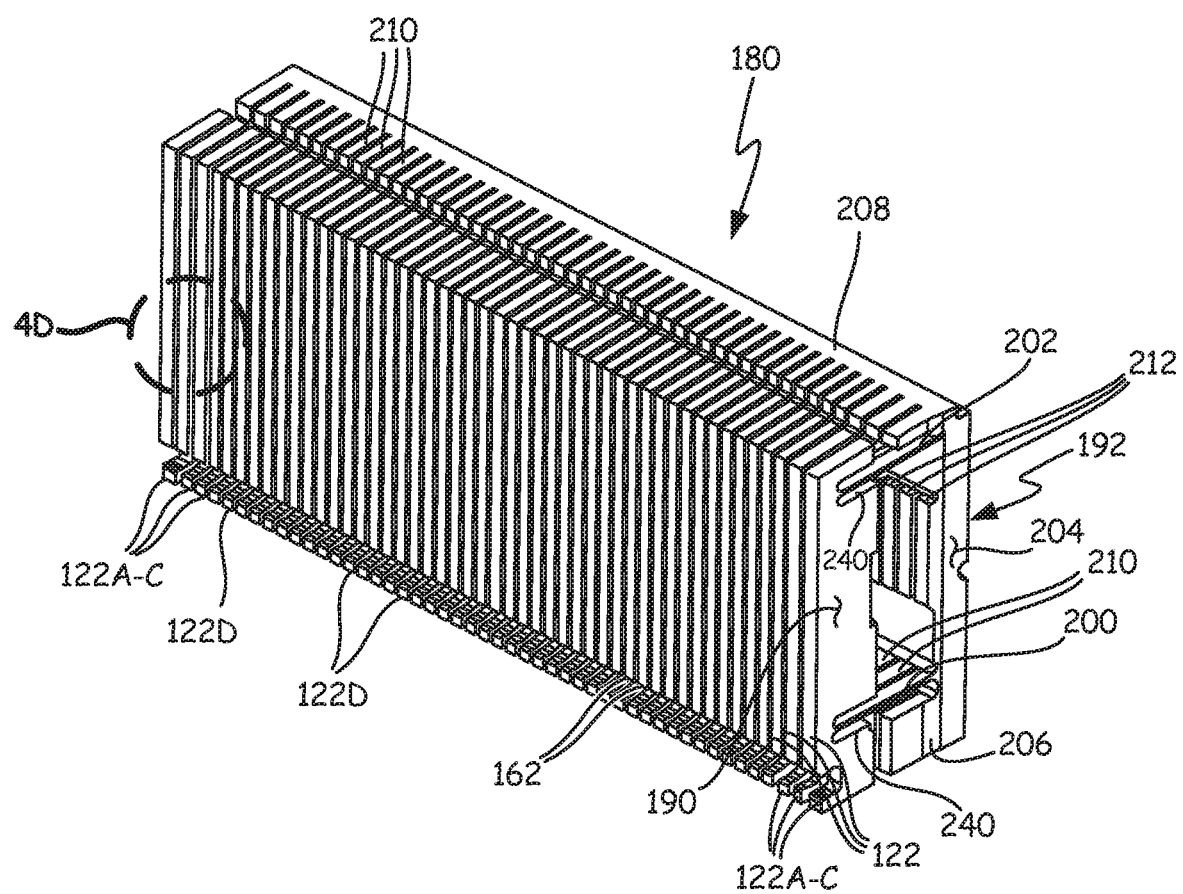
FIG. 4A is a perspective illustration of the bending insert shown in FIGS. 3A-3B.
Figure 4B:
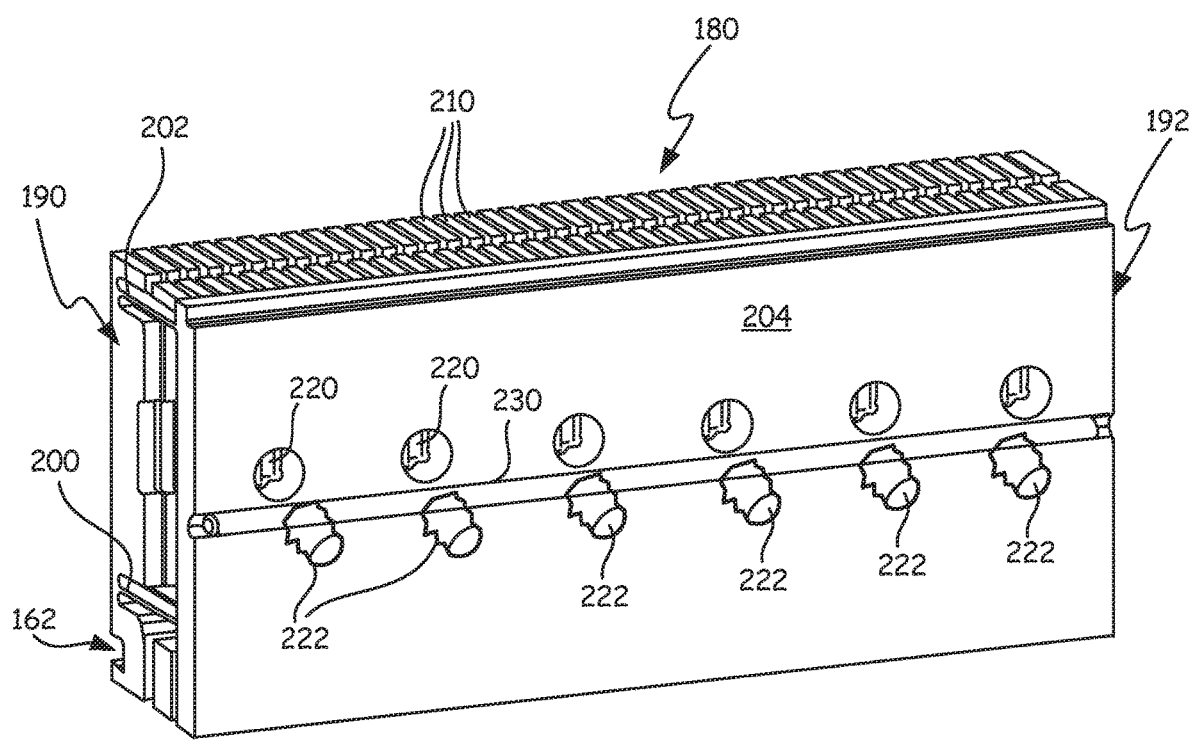
FIG. 4B is a back side view of the bending insert shown in FIG. 4A.
Figure 4C:
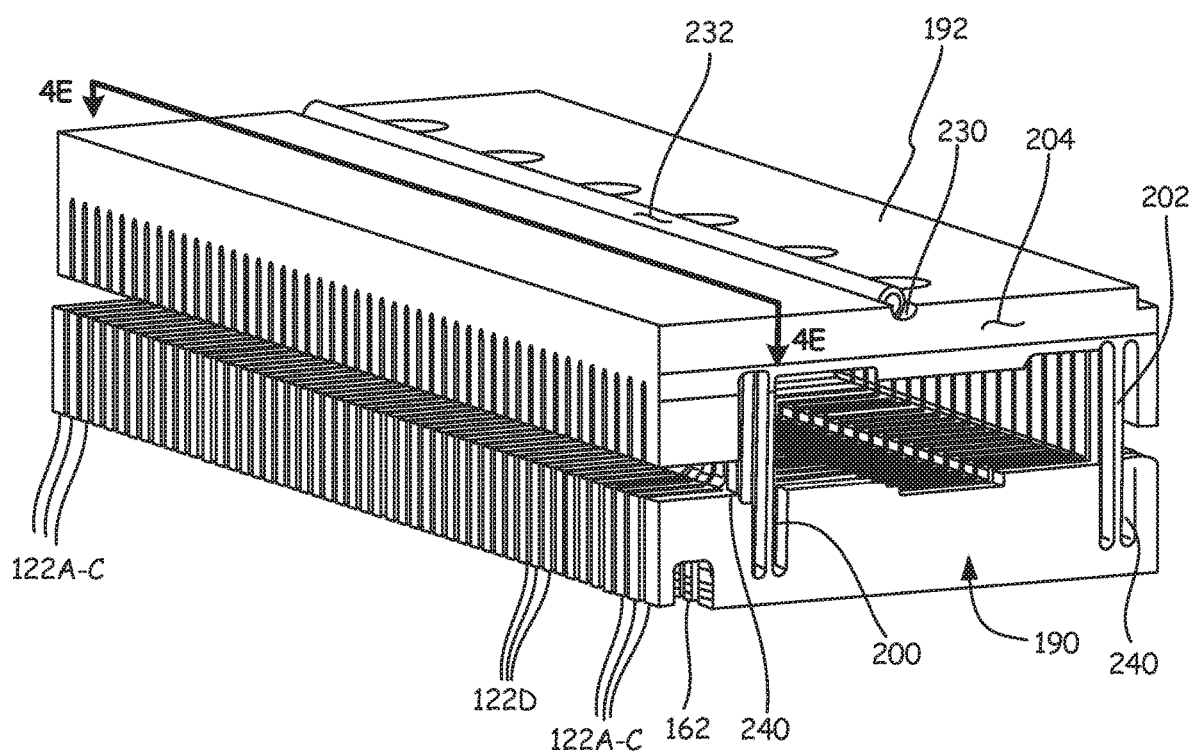
FIG. 4C is an end view of the bending insert shown in FIGS. 4A-4B.

As shown in FIG. 4B, the back part 192 of the bending insert 180 includes a plurality of openings 220 spaced along the upright structure 204. The openings 220 are spaced to align with the openings 188 along a back side of the carrier base 182. Fasteners 222 as schematically shown are inserted into openings 220 on the bending insert 180 and openings 188 on the carrier base 182 to removably connect the insert 180 to the carrier base 182 as previously described in FIG. 3A-3B. As shown in FIG. 4B, the upright structure 204 includes a transverse pin slot 230 used to align the insert 180 in the carrier base 182. As shown in FIG. 4C, a pin 232 extends through pin openings 234 on sides of the carrier base 182 as shown in FIG. 3B (only one pin opening shown in FIG. 3B), and along slot 230 on the insert 180 to align the insert 180 at the proper elevation relative to the carrier base 182.

Figure 4D:
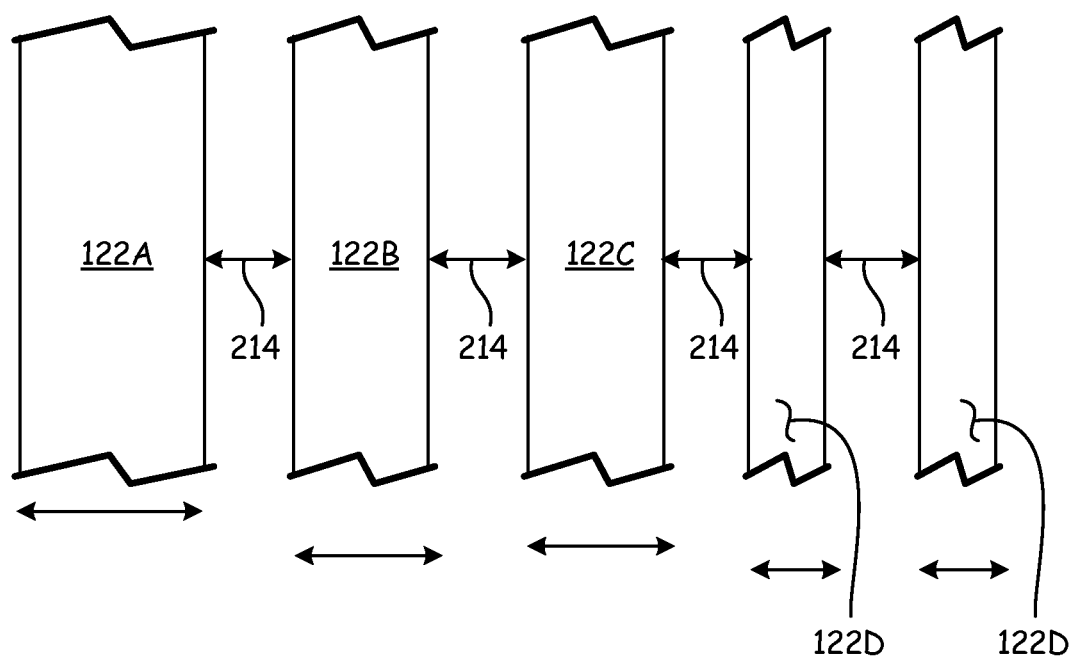
FIG. 4D is a detailed illustration of portion 4D of FIG. 4A shown bending fingers having an adaptive finger width to provide the adaptive bending structure similar to FIG. 2D.

In the illustrated embodiment, the bending insert 180 included bending fingers 122 A-C at outer ends and inner fingers 122D forming the bending nodes to impart bending to the workpiece 124 (not shown in FIGS. 4A-4F) supported on the workpiece platform 126 (not labeled/shown in FIGS. 4A-4F) of the insert 180. FIG. 4D is a detailed illustration of bending fingers 122A-C and inner fingers 122D of the bending insert 180 shown in FIG. 4C. As shown, the inner bending fingers 122D have a finger width corresponding to the width of the actuator fingers and outer bending fingers 122A-C have an adaptive width larger than the width of the inner bending fingers 122D. In the illustrated embodiment, the width of bending finger 122A is larger than the width of bending fingers 122B-C and the width of bending fingers 122B-C is larger than the width of inner bending fingers 122D. The spacing 214 between the bending fingers 122A-D is uniform to align with the spacing between the actuator fingers 142. In illustrated embodiments, the bending insert 180 includes 48 bending fingers between opposed ends of the bending structure.

Figure 4E:
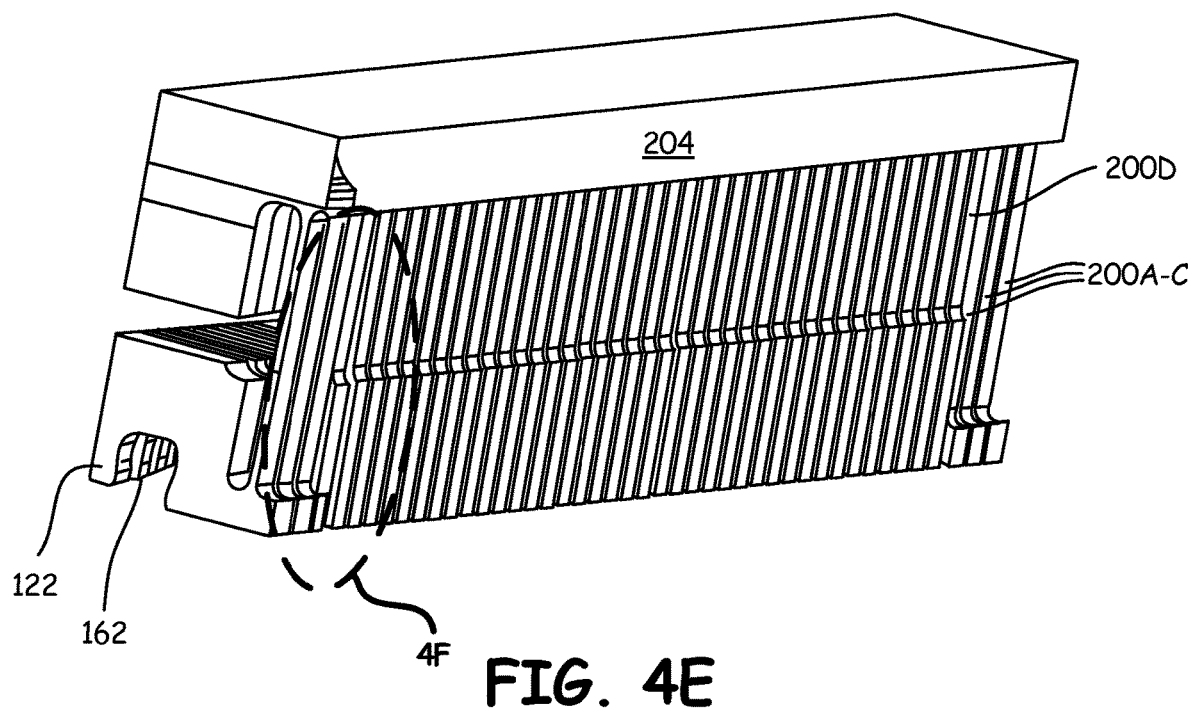
FIG. 4E is a cross-sectional view taken along line 4E-4E of FIG. 4C.
Figure 4F:
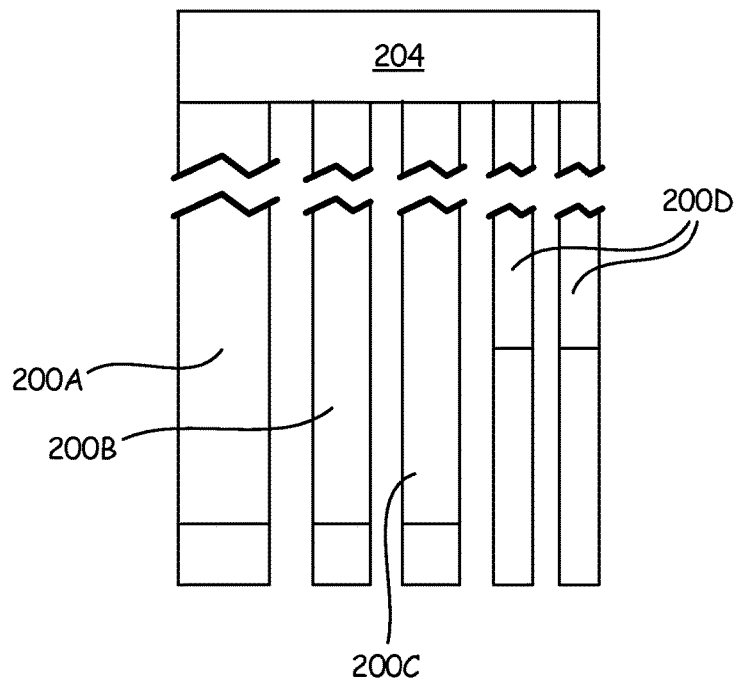
FIG. 4F is a detailed illustration of portion 4F of FIG. 4E.

As previously discussed in connection with FIGS. 4A-4C, upper and lower bending beams 200, 202 connect each of the bending fingers 122 to the back part 192 of the insert 180 FIG. 4E is a cross-sectional view taken along lines 4E-4E of FIG. 4C. As shown, fingers 122A-C and 122D have different beam lengths connecting the front and back parts 190, 192 of the insert 180. As shown, upper beams 200A-C and lower beams 202A-C (not shown) connected to the wider fingers 122A-C at opposed ends of the insert 180 have an extended or longer length than the beam length of upper and lower beams 200D and 202D (not shown) connecting the inner fingers 122D to support structure 204. As shown, in FIG. 4C, the extended length of beams 200A-C and 202A-C (not shown) is formed of upper and lower cut-out portions 240 along the front part 190 of the insert 180. As previously described, the width of bending fingers 122A-C is larger than the width of inner fingers 122D. The extended length of the upper and lower bending beams 200A-C, 202A-C is used to compensate for the increased bending stiffness due to the increased width of the bending fingers 122A-C. The magnitude of the bending input imparted to the workpiece platform 126 (not labeled/shown in FIGS. 4A-4F) is a function of the flexure of the beams 200, 202. The bending input of the beams is generally proportional to the input actuator Force applied to the bending fingers 122 (Actuator$_{input}$), the cross-sectional area dimension of the beam (Area$_{cross-sectional}$) and the length of the beam (L) as follows $$Bending_{input} \approx \frac{Actuator_{input} * L}{Area_{cross-sectional}}$$

Thus the expanded length of the bending beams 200A-C and 202A-C compensates for the reduced bending of the wider beams and provides additional stroke for the same magnitude input force to provide sufficient bending at the outer ends of the workpiece 124. Thus, the assembly uses the control algorithm 156 to calculate the force input for each of the bending nodes 150 based upon desired bending profile and finger 122 width and beam 200, 202 length.

Figure 5:
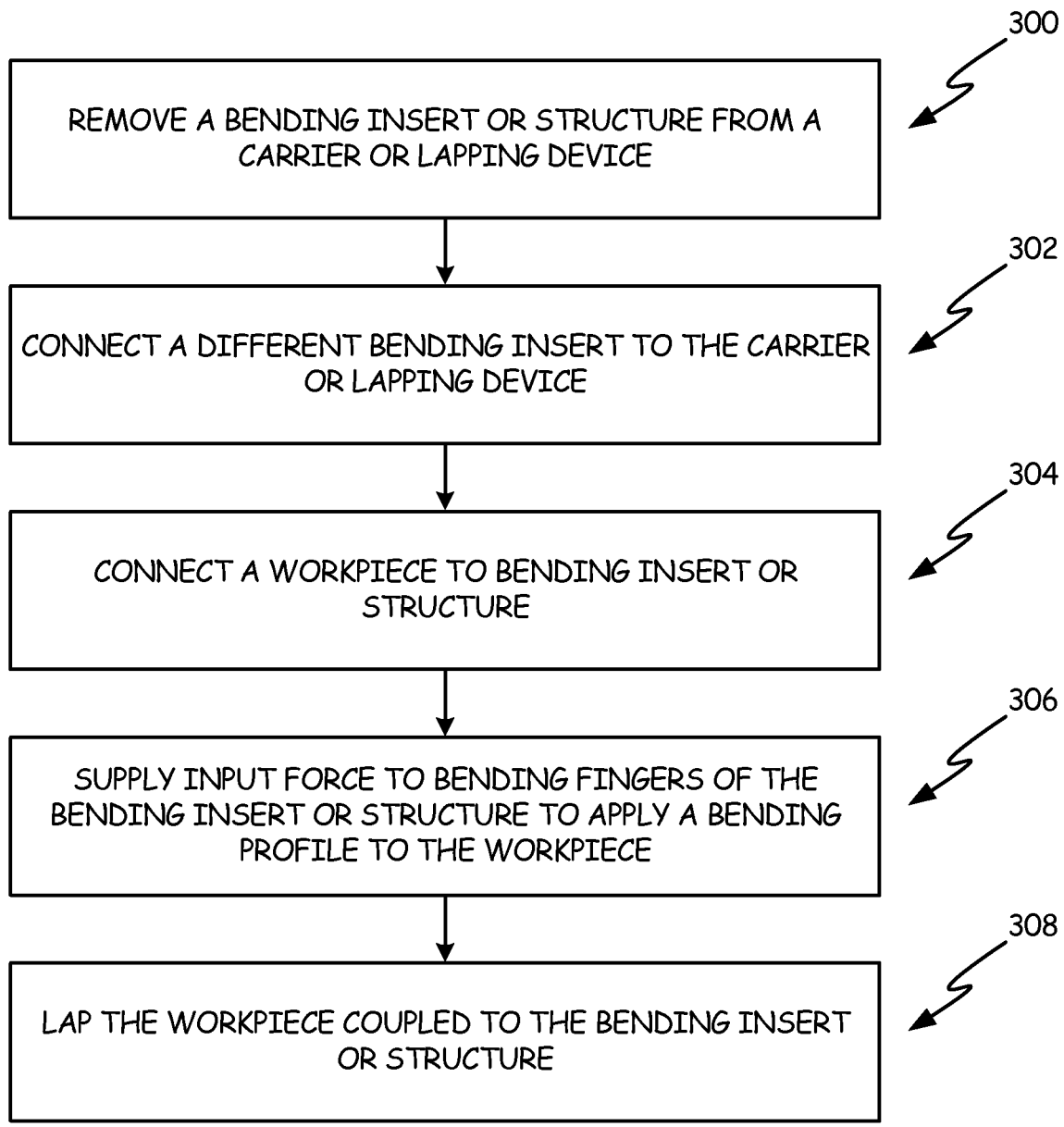
FIG. 5 is a flow chart illustrating steps for adapting a lapping device for different lapping applications. The above drawings are for illustrative purposes and the features and elements shown are not necessarily drawn to scale.

FIG. 5 illustrates process steps for adapting a lapping device for different workpieces to provide an adaptive control width or bending profile as previously described. As illustrated in step 300, a bending insert or structure is removed from the lapping device and a different bending insert or bending structure 120, 120-1, 180 is connected to the lapping device in step 302. In an illustrative embodiment, the bending insert or structure has an adaptive or larger control zone width or beam length to provide additional stroke as described. In illustrated embodiment the bending structure or insert is inserted into an insert cavity 186 of a carrier base 182 and fastened to the carrier base 182 to connect the bending structure to the lapping device. In step 304, the workpiece 124 is coupled to the bending insert or structure and input force is supplied to the bending fingers 122 to apply a bending profile to the workpiece 124 in step 306. In step 308, the workpiece is lapped while input force is applied to the bending fingers 122 of the bending insert or structure.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition to the embodiments described for a slider bar, the lapping structure or components have application for controlling bending for other workpieces during a lapping process as appreciated by those skilled in the art. Thus, as appreciated by those skilled in the art the teachings of the present invention can be applied to other applications, without departing from the scope and spirit of the present invention.

What is claimed is:

1. A bending structure for imparting bending to a workpiece for lapping comprising:
   a plurality of bending fingers extending along a width of the bending structure, wherein each of the bending fingers comprises a front side that includes an actuator-receiving slot that is configured to be directly physically connected to an actuator element to impart bending to the workpiece along the bending structure, and the plurality of bending fingers including at least one bending finger having a different width dimension than one or more other bending fingers;

a conformal and uninterrupted workpiece platform layer directly coupled to the bending fingers and configured to directly couple to the workpiece; and a plurality of bending beams, wherein each of the plurality of bending beams is directly attached to a rear side of a corresponding different one of the plurality of bending fingers and further attached to a back part, each bending beam having a width dimension that corresponds to the width dimension of the corresponding bending finger, such that at least one of the plurality of bending beams has a different width dimension than one or more other ones of the plurality of bending beams, and wherein at least one of the bending beams has a longer length dimension than one or more other bending beams, wherein the lengths of the bending beams extend from the bending fingers to the back part.

2. The bending structure of claim 1 wherein a bending finger width dimension of an outermost bending finger at a first end of the bending structure is larger than a width dimension of an outermost actuator finger, of the actuator elements, connectable to the outermost bending finger at the first end of the bending structure, and wherein a bending finger width dimension of an outermost bending finger at a second end of the bending structure is larger than a width dimension of an outermost actuator finger, of the actuator elements, connectable to the outermost bending finger at the second end of the bending structure.

3. The bending structure of claim 2 wherein the outermost bending finger at the first end of the bending structure is connectable to the outermost actuator finger at the first end off-axis from a center line axis of the outermost actuator finger at the first end in a substantially same plane, and wherein the outermost bending finger at the second end of the bending structure is connectable to the outermost actuator finger at the second end off-axis from a center line axis of the outermost actuator finger at the second end in the substantially same plane.

4. The bending structure of claim 1 wherein the plurality of bending fingers includes a bending finger at a first end and a bending finger at a second end and one or more bending fingers between the bending finger at the first end and the bending finger at the second end and the bending fingers at the first and second ends have a wider width dimension than the one or more bending fingers between the bending finger at the first end and the bending finger at the second end.

5. The bending structure of claim 1 wherein the plurality of bending fingers includes a plurality of outer bending fingers at a first end and a plurality of outer bending fingers at a second end and one or more inner bending fingers between the plurality of outer bending fingers at the first end and the plurality of outer bending fingers at the second end and the plurality of outer bending fingers at the first and second ends have a larger width dimension than the one or more inner bending fingers.

6. The bending structure of claim 5 wherein the plurality of outer bending fingers at the first and second ends include a first outer bending finger and a second outer bending finger spaced outwardly from the first outer bending finger and the second outer bending finger having a wider width dimension than the first outer bending finger.

7. The bending structure of claim 6, wherein the bending structure includes a third outer bending finger at the first and second ends and the third outer bending finger has a wider width dimension than the one or more inner bending fingers.

8. The bending structure of claim 1 in combination with a carrier base including opposed flange portions to connect the carrier base to a lapping arm of a lapping device and the bending structure is a bending insert, which includes the plurality of bending fingers and the plurality of bending beams, wherein the bending insert is connectable to the carrier base through one or more fastener elements.

9. The bending structure of claim 8 wherein the carrier base includes an insert cavity and the bending insert is removably supported in the insert cavity of the carrier base, and wherein the plurality of bending fingers and the plurality of bending beams are within the insert cavity of the carrier base and are surrounded by walls of the insert cavity of the carrier base when the bending insert is supported in the insert cavity.

10. The bending structure of claim 1 wherein the plurality of bending fingers include one or more outer bending fingers at opposed ends of the bending structure connected to outer bending beams and the outer bending beams having the longer length dimension than one or more inner bending beams connected to one or more inner bending fingers.

11. The bending structure of claim 1 and wherein one actuator-receiving slot of one of the plurality of bending fingers has a different width dimension than another actuator-receiving slot of another one of the plurality of bending fingers.

12. The bending structure of claim 1 and wherein each of the bending fingers includes the actuator-receiving slot that has a substantially U-shape.

13. A lapping assembly including a bending structure having a plurality of bending beams and a plurality of bending fingers, the plurality of bending fingers comprising rear sides which are each directly attached to at least one of the plurality of bending beams to impart bending to a workpiece, the plurality of bending beams further attached to a back part, and including one or more outer bending beams at a first end and one or more outer bending beams at a second end having a longer bending beam length than one or more inner bending beams attached to one or more inner bending fingers, wherein the lengths of the bending beams extend from the bending fingers to the back part, wherein the one or more outer bending beams at the first end and the one or more outer bending beams at the second end include an outermost bending beam having the longer bending beam length, and wherein a front side of each of the bending fingers includes an actuator-receiving slot that is configured to be directly physically connected to an actuator element.

14. The lapping assembly of claim 13 wherein one or more outer bending fingers at the first end and one or more outer bending fingers at a second end eeaipled attached to the one or more bending beams at the first and second ends have a wider width dimension than the one or more inner bending fingers.

15. The lapping assembly of claim 14 wherein the one or more outer bending fingers comprise first outer bending fingers at the first and second ends and second outer bending fingers at the first and second ends and the second outer bending fingers have a wider width dimension than the first outer bending fingers.

16. The lapping assembly of claim 15 and further comprising third outer bending fingers at the first and second ends having a wider width dimension than the one or more inner bending fingers and a different width dimension than the second outer bending fingers at the first and second ends.

17. The lapping assembly of claim 13 wherein the plurality of bending beams comprises a plurality of upper bending beams and a plurality of lower bending beams, wherein each bending finger is attached to a respective upper bending beam and lower bending beam of the plurality of bending beams.

18. A bending structure for imparting bending to a workpiece for lapping comprising:
- a plurality of bending fingers extending along a width of the bending structure, wherein each of the bending fingers comprises a front side that includes an actuator-receiving slot that is configured to directly physically couple to a solid actuator element to impart bending to the workpiece along the bending structure, and the plurality of bending fingers including at least one bending finger having a different width dimension than one or more other bending fingers;
- a conformal and uninterrupted workpiece platform layer directly coupled to the bending fingers and configured to directly couple to the workpiece; and
- a plurality of bending beams, wherein each of the plurality of bending beams is directly attached to a rear side of a corresponding different one of the plurality of bending fingers and further attached to a back part, each bending beam having a width dimension that corresponds to the width dimension of the corresponding bending finger, such that at least one of the plurality of bending beams has a different width dimension than one or more other ones of the plurality of bending beams, and wherein at least one of the bending beams has a longer length dimension than one or more other bending beams, wherein the lengths of the bending beams extend from the bending fingers to the back part.

* * * * *

UNITED STATES PATENT AND TRADEMARK OFFICE
CERTIFICATE OF CORRECTION

PATENT NO. : 10,843,305 B2
APPLICATION NO. : 14/215921
DATED : November 24, 2020
INVENTOR(S) : Hew Peng Koon et al.

It is certified that error appears in the above-identified patent and that said Letters Patent is hereby corrected as shown below:

In the Claims

Column 8, Claim 14, Line 50, delete the word "eeaipled".

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*